United States Patent
Arefjord et al.

(10) Patent No.: US 11,136,874 B2
(45) Date of Patent: Oct. 5, 2021

(54) SOLID PARTICLE SEPARATION IN OIL AND/OR GAS PRODUCTION

(71) Applicant: FourPhase AS, Os (NO)

(72) Inventors: Anders Arefjord, Os (NO); Jorgen Bruntveit, Os (NO)

(73) Assignee: FourPhase AS, Os (NO)

( * ) Notice: Subject to any disclaimer, the term of this patent is extended or adjusted under 35 U.S.C. 154(b) by 376 days.

(21) Appl. No.: 16/325,229

(22) PCT Filed: Jul. 18, 2017

(86) PCT No.: PCT/EP2017/068150
§ 371 (c)(1),
(2) Date: Feb. 13, 2019

(87) PCT Pub. No.: WO2018/033330
PCT Pub. Date: Feb. 22, 2018

(65) Prior Publication Data
US 2019/0178071 A1    Jun. 13, 2019

(30) Foreign Application Priority Data
Aug. 19, 2016 (GB) .................................. 1614222

(51) Int. Cl.
*E21B 43/34* (2006.01)
*B01D 21/26* (2006.01)
*B04C 5/28* (2006.01)

(52) U.S. Cl.
CPC ............ *E21B 43/34* (2013.01); *B01D 21/267* (2013.01); *B04C 5/28* (2013.01)

(58) Field of Classification Search
CPC .......... E21B 43/34; E21B 43/36; E21B 21/06; B01D 21/267; B04C 5/28
See application file for complete search history.

(56) References Cited

U.S. PATENT DOCUMENTS

RE25,099 E * 12/1961 Hoffman .................. D21D 5/06
                                                   209/711
4,353,719 A   10/1982 Kennedy, Jr.
(Continued)

FOREIGN PATENT DOCUMENTS

CN        205330648        6/2016
EP        0400897 A1      12/1990
(Continued)

OTHER PUBLICATIONS

Combined Search and Examination Report in related GB1905935.1 dated Aug. 2, 2019.
(Continued)

*Primary Examiner* — Daniel P Stephenson
(74) *Attorney, Agent, or Firm* — Polsinelli, P.C.

(57) ABSTRACT

Apparatus for separating solid particles from a hydrocarbon-containing fluid produced from an oil and/or gas production facility, supported on a wellhead or a riser connected to a wellhead, the apparatus comprising: a conduit for conveying a hydrocarbon-containing fluid from a wellhead or a riser connected to the wellhead; a solids separator in fluid communication with the conduit adapted to separate solid particles from the hydrocarbon-containing fluid, a solids outlet for outputting solid particles separated by the solids separator, a fluid outlet for outputting hydrocarbon-containing fluid separated by the solids separator; and an output conduit, coupled to the fluid outlet, for conveying the hydrocarbon-containing fluid from the fluid outlet into a production line attached to the wellhead.

27 Claims, 5 Drawing Sheets

(56) References Cited

U.S. PATENT DOCUMENTS

| | | | |
|---|---|---|---|
| 4,354,719 A | 10/1982 | Weidler | |
| 6,058,975 A | 5/2000 | Hui-Chen | |
| 6,279,658 B1 | 8/2001 | Donovan et al. | |
| 7,828,058 B2* | 11/2010 | Fielder | E21B 43/385 |
| | | | 166/250.15 |
| 9,291,021 B2* | 3/2016 | Donald | E21B 33/038 |
| 9,556,710 B2* | 1/2017 | Donald | E21B 33/076 |
| 2003/0168391 A1* | 9/2003 | Tveiten | B01D 17/0208 |
| | | | 210/188 |
| 2005/0061514 A1 | 3/2005 | Hopper | |
| 2005/0061515 A1 | 3/2005 | Hopper | |
| 2005/0173322 A1 | 8/2005 | Ostergaard | |
| 2005/0236324 A1 | 10/2005 | Mildren et al. | |
| 2010/0284730 A1 | 11/2010 | Boticki | |
| 2011/0266228 A1 | 11/2011 | Brown et al. | |
| 2014/0332226 A1* | 11/2014 | Donald | E21B 43/16 |
| | | | 166/368 |
| 2019/0178071 A1* | 6/2019 | Arefjord | B04C 5/28 |

FOREIGN PATENT DOCUMENTS

| | | |
|---|---|---|
| EP | 1518595 A1 | 3/2005 |
| GB | 2439528 A | 1/2008 |
| GB | 2490346 A | 10/2012 |
| GB | 2529729 B | 2/2016 |
| GB | 2529729 A | 3/2016 |
| WO | 2007132996 A1 | 11/2007 |
| WO | WO2015095886 A1 | 6/2015 |

OTHER PUBLICATIONS

Combined Search and Examination Report under Sections 17 and 18(3) dated Feb. 22, 2017 in GB1614222.6.

International Search Report and Written Opinion in PCT/EP2017/068150 dated Nov. 6, 2017.

Partial European Search Report in related EP19160015.4 dated Jul. 9, 2019.

\* cited by examiner

SOLID PARTICLE SEPARATION IN OIL AND/OR GAS PRODUCTION

FIELD OF THE INVENTION

The present invention relates to an apparatus for, and a method of, separating solid particles (usually sand) from a hydrocarbon-containing fluid produced from an oil and/or gas production facility. In particular, this invention relates to an apparatus and method for the separation of solid particles from a well using a riser integrated apparatus, which significantly reduces the space and payload capacity required on the production platform or rig, thus reducing production cost.

BACKGROUND

Many offshore oil and gas fields are developed and produced from wells that have a subsea wellhead from which a pipeline/flowline brings the production to the platform. The production then flows through various pipelines onto the platform where it can be processed. In particular, sand (or solids) are often produced with the oil and or gas production and it is preferable that this be removed from the produced fluids as soon as possible, otherwise it can lead to erosion or blockage within the processing equipment including pipelines. These issues can result in more frequent downtime of the equipment for maintenance or remedial cleaning, which in turn causes interruption in production and increases the overall cost of production. Sand removal is often achieved using a solids separator installed on the platform or rig. This equipment can be large and heavy requiring a lot of space on the platform. In many cases sand production is not an issue until the well has been producing for many years and the platform may not have been equipped with solids removal equipment and, indeed, many not be specified to take such equipment. In the case of offshore field development, production platforms can be floating, e.g., FPSO (Floating Production Storage and Offloading) or permanent platform structures. Such productions units are very expensive systems and platform space comes at a premium. As an illustration, costs can be $100,000 per tonne of payload and $25,000 per square meter of facility area. As a result, reducing the weight and size required for process equipment on the platform is very important.

Generally, the quantity of sand produced is low or non-existent in the early stages of the well life, but can be significant after many years of production. Therefore, the specification of the production platform can change with time. Additionally, the requirements for platform space and payload may change over the many years of production, such that when solids removal, or increased solids removal, is required, there is very little space available. Changing or upgrading the platform for the required additional equipment can be very expensive. In some cases, production is from a subsea wellhead with small satellite platforms, which have no infrastructure to handle solids removal. As a result, produced fluids with solids flow through subsea pipelines and these pipelines can become blocked as the amount of produced sand increases.

The present inventors have worked to establish technical solutions to the above restrictions associated with technology presently used in the industry or disclosed in the prior art.

SUMMARY OF THE INVENTION

In a first aspect, the present invention provides an apparatus for separating solid particles from a hydrocarbon-containing fluid produced from an oil and/or gas production facility, the apparatus being adapted to be supported on a wellhead or a riser connected to a wellhead, the apparatus comprising: a conduit for conveying a hydrocarbon-containing fluid from a wellhead, the conduit being adapted to be connected to the wellhead or a riser connected to the wellhead; a solids separator in fluid communication with the conduit, the solids separator being adapted to separate solid particles from the hydrocarbon-containing fluid, the solids separator having an inlet, coupled to the conduit, for the hydrocarbon-containing fluid, a solids outlet for outputting solid particles separated by the solids separator from the hydrocarbon-containing fluid, and a fluid outlet for outputting hydrocarbon-containing fluid separated by the solids separator from the solid particles; and an output conduit, coupled to the fluid outlet, for conveying the hydrocarbon-containing fluid from the fluid outlet into a production line attached to the wellhead.

Optionally, the solids separator is a hydrocyclone. Typically, a solid particles collection unit located beneath the solids separator such that the separated solid particles from the solids separator pass under the action of gravity into, and are collected in, said solid particles collection unit. A weighing device for weighing the separated solid particles in said solid particles collection unit may be provided. Optionally, a fluidisation flushing system is located in the vicinity of the solid particles collection unit for flushing solid particles from the solid particles collection unit. A controller for the fluidisation flushing system may be arranged to operate the fluidisation flushing system based on a solids weight in the solid particles collection unit detected by the weighing device. Optionally, at least one isolation valve may be provided between the solids separator and the solid particles collection unit, said at least one isolation valve being operable to close and isolate the solid particles collection unit from the solids separator.

Preferably, the conduit incorporates, at an input end thereof, a flange for connection to a corresponding flange of the wellhead or riser. Preferably, the conduit incorporates, at a closed end thereof, a blanking flange for closing the closed end, the inlet for the hydrocarbon-containing fluid being located upstream, with respect to fluid flow along the conduit, of the closed end.

Preferably, a flow adaptor is adapted to be installed in the wellhead, wherein the flow adapter provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles, wherein the first and second flow conduits are configured to prevent mixing of the first and second flows. Typically, the flow adaptor comprises a tubular element having a pair of annular seals, each annular seal being located at a respective opposite end of the tubular element, the annular seals being adapted sealingly to engage an inner surface of the wellhead and the tubular element having a central part with a smaller cross-sectional area than the wellhead.

Preferably, a plurality of the solids separators are provided in fluid communication with the conduit, the solids separators being arranged in a parallel configuration, each solid separator having a respective inlet coupled to the conduit and a respective fluid outlet, the plurality of fluid outlets being connected to a manifold to which the output conduit is connected.

The output conduit may be adapted to be connected to a kill line of the wellhead.

In a second aspect, the present invention provides a method of separating solid particles from a hydrocarbon-containing fluid produced from an oil and/or gas production facility, the method comprising the steps of:

(i) passing a hydrocarbon-containing fluid containing solid particles from a wellhead into a conduit supported on and connected to the wellhead or a riser connected to the wellhead;

(ii) passing the hydrocarbon-containing fluid containing solid particles from the conduit into a solids separator, mounted on the conduit, through an inlet of the solids separator;

(iii) separating solid particles from the hydrocarbon-containing fluid in the solids separator;

(iv) outputting separated solid particles through a solids outlet of the solids separator; and (v) outputting, through an output conduit into a production line attached to the wellhead, the output conduit being coupled to a fluid outlet of the solids separator, the hydrocarbon-containing fluid which has been separated from the solid particles by the solids separator.

Optionally, the solids separator may be a hydrocyclone. Typically, the separated solid particles are collected in a solid particles collection unit coupled to the solids outlet. Optionally, the separated solid particles collected in the solid particles collection unit are continuously or intermittently weighed. Separated solid particles may be flushed from the solid particles collection unit using a fluidisation flushing system. Optionally, the flow of water through the fluidisation flushing system may be directed according to the weight of separated solid particles in the solid particles collection unit. The solid particles collection unit may be isolated from the solids separator prior to flushing the separated solid particles from the solid particles collection unit using at least one isolation valve.

Preferably, a flow adaptor is installed in the wellhead, wherein the flow adapter provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles. Preferably, the first and second flow conduits are configured to prevent mixing of the first and second flows. In step (i), the hydrocarbon-containing fluid containing solid particles preferably passes through the first flow conduit and in step (v), the hydrocarbon-containing fluid which has been separated from the solid particles by the solids separator preferably passes through the second flow conduit. Typically, the flow adaptor comprises a tubular element having a pair of annular seals, each annular seal being located at a respective opposite end of the tubular element, the annular seals sealingly engaging an inner surface of the wellhead and the tubular element having a central part with a smaller cross-sectional area than the wellhead.

Optionally, the wellhead has a kill line. The output conduit may be connected to the kill line. Optionally, step (v) further comprises conveying the hydrocarbon-containing fluid which has been separated from the solids separated by the solids separator through the wellhead via the kill line to the production line.

Preferably, the method of this aspect of the present invention continuously separates solid particles from a continuous flow of a hydrocarbon-containing fluid produced from an oil and/or gas production facility.

Preferably, a plurality of the solids separators are provided in fluid communication with the conduit, the solids separators being arranged in a parallel configuration, each solid separator having a respective inlet coupled to the conduit and a respective fluid outlet, the plurality of fluid outlets being connected to a manifold to which the output conduit is connected. Preferably for at least a portion of the method of separating solid particles from a hydrocarbon-containing fluid produced from an oil and/or gas production facility, at least one of the plurality of the solids separators is in a separation mode while at least one other of the plurality of the solids separators is in a solids flushing mode. Optionally, each of the plurality of the solids separators alternates between a separation mode and a solids flushing mode.

In a third aspect, the present invention provides an apparatus for separating solid particles from a hydrocarbon-containing fluid produced from an oil and/or gas production facility, the apparatus being supported on a wellhead or a riser connected to a wellhead, the apparatus comprising: a conduit for conveying a hydrocarbon-containing fluid from a wellhead, the conduit being connected to the wellhead or a riser connected to the wellhead; a modular system for separating solid particles from the hydrocarbon-containing fluid, the modular system comprising at least two modules, each module of the modular system comprising: a solids separator in fluid communication with the conduit, the solids separator being adapted to separate solid particles from the hydrocarbon-containing fluid, the solids separator having an inlet, coupled to the conduit, for the hydrocarbon-containing fluid, a solids outlet for outputting solid particles separated by the solids separator from the hydrocarbon-containing fluid, and a fluid outlet for outputting hydrocarbon-containing fluid separated by the solids separator from the solid particles; and an output conduit, coupled to the fluid outlets, for conveying the hydrocarbon-containing fluid from the fluid outlets of the modular system into a production line attached to the wellhead.

Preferably, the output conduit further comprises a flow collection component attached to the fluid outlet of each module to collect and comingle hydrocarbon-containing fluid. Optionally, the flow collection component comprises a manifold.

Optionally, the solids separators are hydrocyclones. Typically, each module further comprises a solid particles collection unit located beneath the solids separator such that the separated solid particles from the solids separator pass under the action of gravity into, and are collected in, said solid particles collection unit. Optionally, each module further comprises a weighing device for weighing the separated solid particles in said solid particles collection unit. Each module may further comprise a fluidisation flushing system located in the vicinity of the solid particles collection unit for flushing solid particles from the solid particles collection unit. Optionally, each module further comprises a controller for the fluidisation flushing system, the controller being arranged to operate the fluidisation flushing system based on a solids weight in the solid particles collection unit detected by the weighing device. Each module may further comprise at least one isolation valve between the solids separator and the solid particles collection unit, said at least one isolation valve being operable to close and isolate the solid particles collection unit from the solids separator.

Preferably, the conduit incorporates, at an input end thereof, a flange for connection to a corresponding flange of the wellhead or riser.

Preferably, a flow adaptor is adapted to be installed in the wellhead, wherein the flow adapter provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles, wherein the first and second flow conduits are configured to prevent mixing of the first and second flows. Typically, the flow adaptor comprises a tubular element having a pair of annular seals, each annular seal being located at a respective opposite end of the tubular element, the annular seals being adapted sealingly to engage an inner surface of the wellhead and the tubular element having a central part with a smaller cross-sectional area than the wellhead.

The output conduit may be adapted to be connected to a kill line of the wellhead.

Preferably, the modules are arranged in a parallel configuration, each solid separator having a respective inlet coupled to the conduit and a respective fluid outlet, the plurality of fluid outlets being connected to a manifold to which the output conduit is connected. Optionally, a controller may be provided for controlling the modular system whereby for at least a portion of time during a period of separating solid particles from the hydrocarbon-containing fluid produced from the oil and/or gas production facility, at least one of the plurality of the solids separators is in a separation mode while at least one other of the plurality of the solids separators is in a solids flushing mode. Optionally, the controller may be adapted independently to control each module so as selectively to be in a separation mode or a solids flushing mode.

The preferred embodiment of the present invention accordingly provides an apparatus for separating solid particles from a hydrocarbon-containing fluid produced from an oil and gas production facility using a compact unit, which is installed on a riser or a wellhead, and directly supported on the riser or wellhead structure rather than on the production platform. This could be a subsea wellhead. The apparatus preferably comprises modular elements, where the number of modules can be increased as the amount of sand produce increases. Each module preferably comprises a hydrocyclone that will separate the solids from the produced fluids, a solid particles collection unit where separated solids will collect and a flushing system to allow the collected solids to be removed once their volume or weight has reached a pre-defined threshold. Preferably, there are valves between the hydrocyclone separator and the solid particles collection unit, so that the solid particles collection unit can be isolated from the hydrocyclone during the flushing operation. Each unit would typically handle 10,000 bbl/day of produced fluids and 100,000 standard cubic meters (SM3) of gas per day and would weigh between 1 and 2 tonnes.

Each module is connected to a conduit, which may be connected to a riser that is carrying production from the wellhead. Additionally, the produced fluids that have been cleaned of solids by each module are comingled in a single collector that is hanging on the riser. As a result, the weight of all modules is supported on the wellhead rather than on the platform. As an example, a 4-module system would weigh between 4-8 tonnes and could handle 40,000 bbl/day and 400,000 SM3 of production. The comingled fluids are returned through the wellhead via a 'flow adaptor' to exit the wellhead through the same fluid production flowline that would be used if the solids separator was not present. Such an arrangement allows solids separator modules to be placed onto a standard wellhead without the requirement to significantly change the production flowlines. It also allows the solids separator system to comprise multiple separator modules that are configurable, and is easily adaptable for installation on remote/satellite subsea wellheads. This provides several technical benefits including, for example, firstly the number of modules can be increased as sand production increases and, with at least two modules, production can be continuous because while one solid particles collection unit is being flushed the other unit can continue to separate solids from the production flow. Additionally, older wells with standard wellheads can be easily equipped with a configurable solids separation unit without the major costs generally associated with platform upgrades required to accommodate the equipment presently available on the market and which represents the prior art.

BRIEF DESCRIPTION OF THE DRAWINGS

Embodiments of the present invention will now be described in more detail by way of example only with reference to the accompanying drawings, in which.

DETAILED DESCRIPTION

Figure 1:
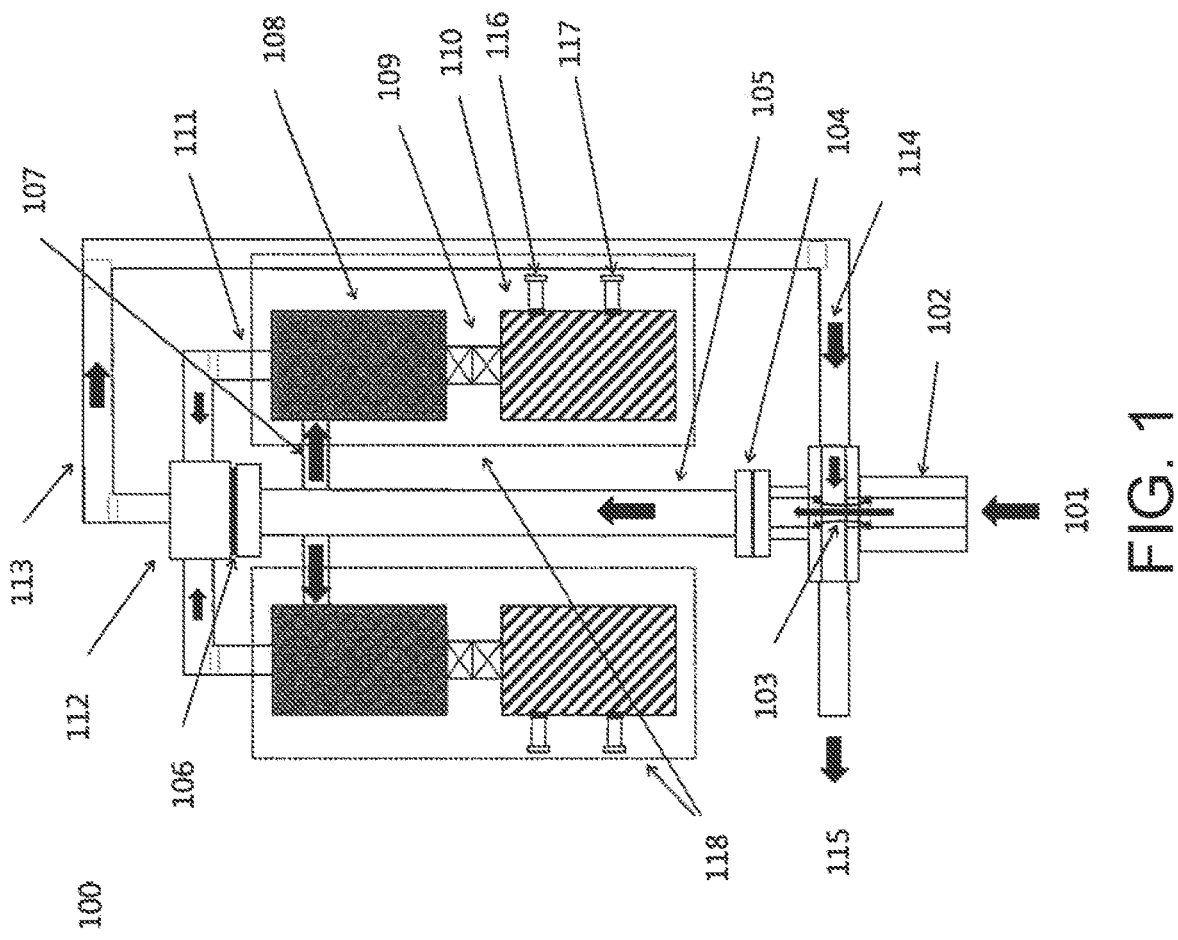
FIG. 1 schematically illustrates a side view of a solid particles separation system in accordance with an embodiment of the present invention.

Referring to FIG. 1 there is shown a schematic illustration of a solids separation system, designated generally as 100, which constitutes an apparatus for separating solid particles from a hydrocarbon-containing fluid produced from an oil and/or gas production facility in accordance with a preferred embodiment of the present invention.

Figure 5:
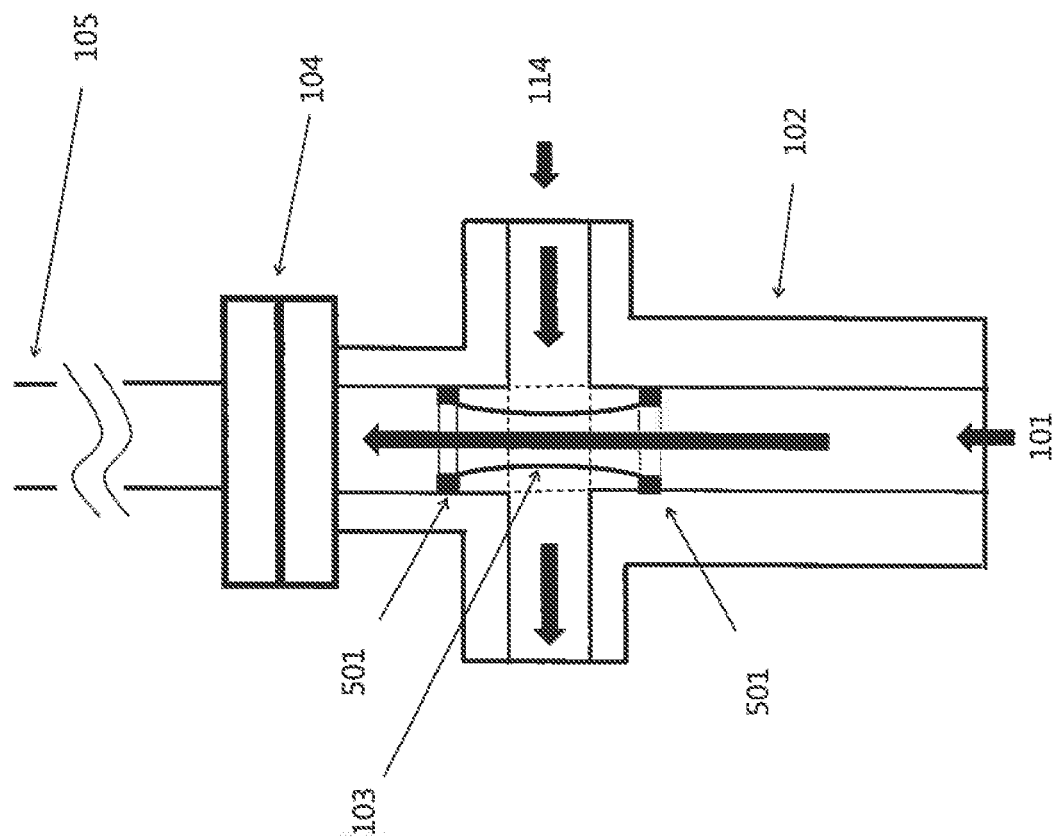
FIG. 5 schematically illustrates a cross-sectioned side view of a wellhead with an installed flow adaptor and riser to channel production flow to the modular solids separator system.

The separation system 100 comprises a modular system that comprises two identical modules 118. Generally the system can consist of one or more of these modules, but two are shown in the side view in FIG. 1. Oil and/or gas production leaves a well and enters the wellhead, 102, as illustrated by arrow 101. This production flow may contain solid particles, usually sand, entrained within the hydrocarbon flow. The wellhead has a flow adaptor installed within it as labelled 103 in FIGS. 1 and 5. A more detailed schematic of the wellhead is shown in FIG. 5. The flow adaptor serves to ensure flow entering the wellhead is directed through the well and into the riser 105 that is connected to the wellhead by means of the flanges 104. In FIG. 5 there is shown two seals, 501, one on either side of the flow adaptor and prevent flow 101 from exiting the wellhead through any other exit other than the one connected to the riser 105. These could be compression type seals or another other suitable type. At the top of the riser there is a blanking flange 106, in FIG. 1, which forces the produced fluids into the solids separation modules labelled 118 via conduits 107.

Figure 8:
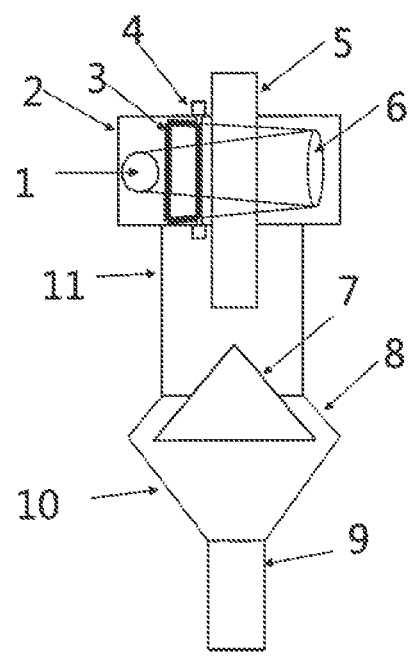
FIG. 8 shows a cross-sectioned side view of a hydrocyclone unit.

Each module 118 comprises a hydrocyclone unit, 108, and a solid particles collection unit 110. Fluid leaving the riser 105 enters the hydrocyclone unit 108 via the conduit 107. Preferably, the hydrocyclone unit 108 is a dynamic cyclone as shown in FIG. 8 and described in GB-A-2529729; however, any other suitable hydrocyclone could be used. The fluid/particle mixture entering hydrocyclone unit 108 creates a rotation flow through the hydrocyclone where the heavier particles are thrown outwards by centrifugal forces towards the cyclone wall. Here they will be slowed by frictional forces at the wall and will drop out of the liquid phase into the solids collection unit 110 via isolation valves 109 that are open during operation.

Figure 7:
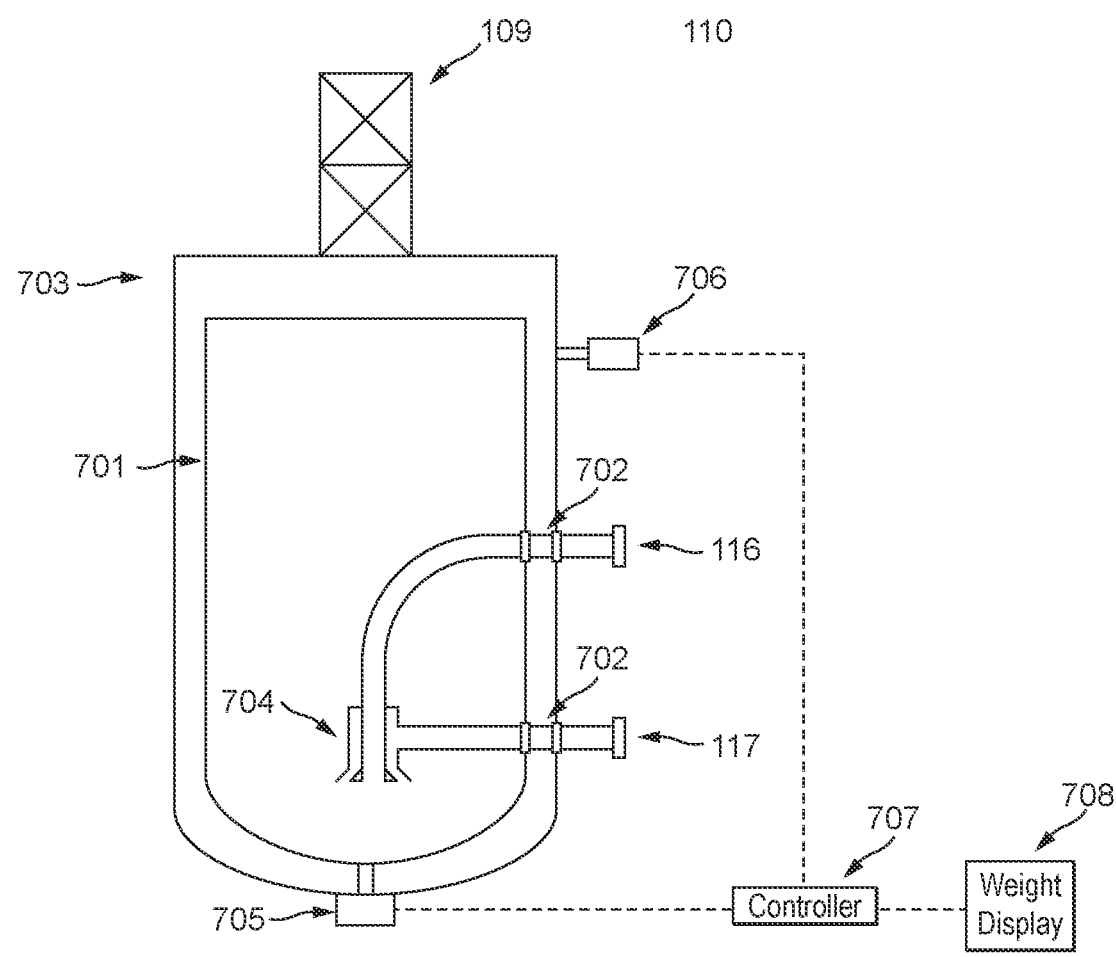
FIG. 7 shows a cross-sectioned side view of a solids collection unit with flushing system.

The solids collection unit 110 collects and weighs solids particles separated from the produced hydrocarbon fluids and allows them to be flushed from the module using a fluidisation flushing system, where water is injected through water inlet 117 and a mixture of water and solids leaves the unit through outlet 116. FIG. 7 schematically illustrates the operation of the solids collection unit 110. The flushing system is controlled by controller 707, which uses the mass or volume (knowing the density of the sand) of collected solids. This is determined by weight sensor 705 compensated for changes in vessel pressure using readings from pressure sensor 706. Once the mass or volume of collected solids increases above a predetermined threshold, the isolation valves 109 are closed and water is injected through water inlet 117. This fluidises the solids and forces a water/solids mixture to exit the unit through solids outlet 116. Flushing continues until the measured mass or volume of solids in the unit is reduced below a second predefined threshold. When this occurs, water injection is stopped and the isolation valves 109 are opened so that solids particle collection can resume. It should be noted that the modules 118 can alternate between solids particle collection and flushing cycles so that at least one module is always receiving produced fluids 101 while another module(s) is (are) being flushed and production is not stopped.

Figure 2:
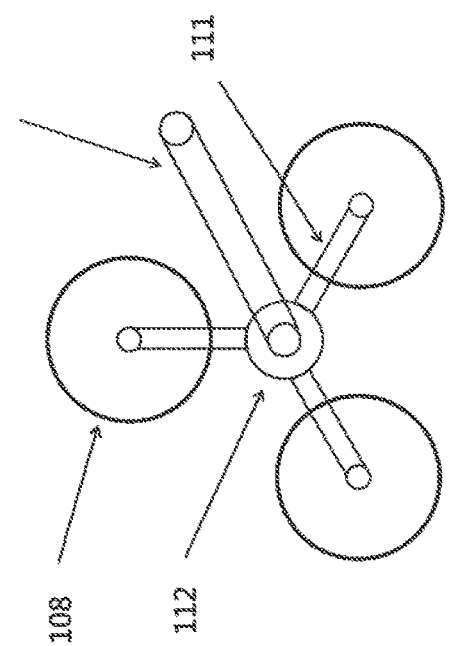
FIG. 2 schematically illustrates a top view of a four module separation system.
Figure 3:
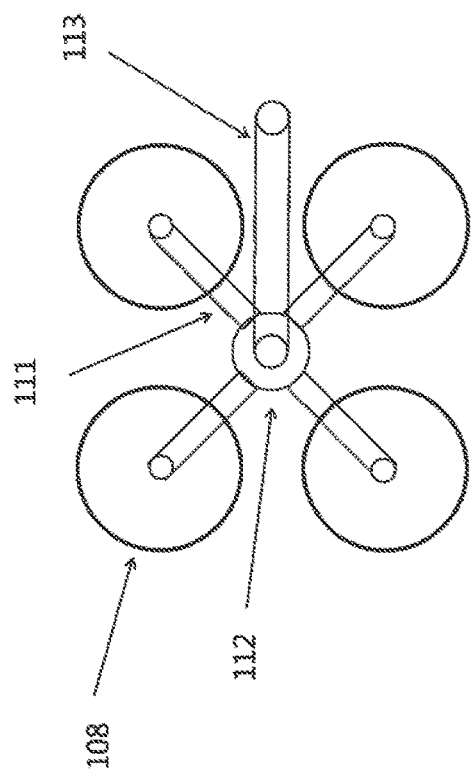
FIG. 3 provides a top view schematic of a three module solids separation system.
Figure 4:
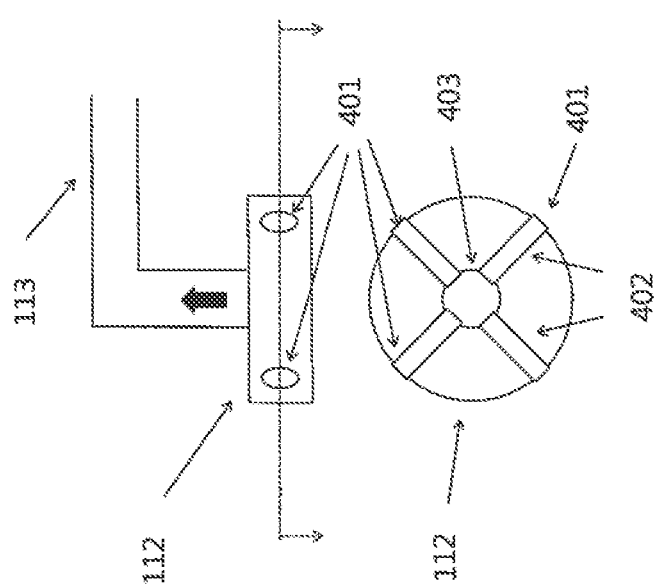
FIG. 4 schematically illustrates a side view and a sectioned top view of a fluid collection element for a 4 module separation system.
Figure 6:
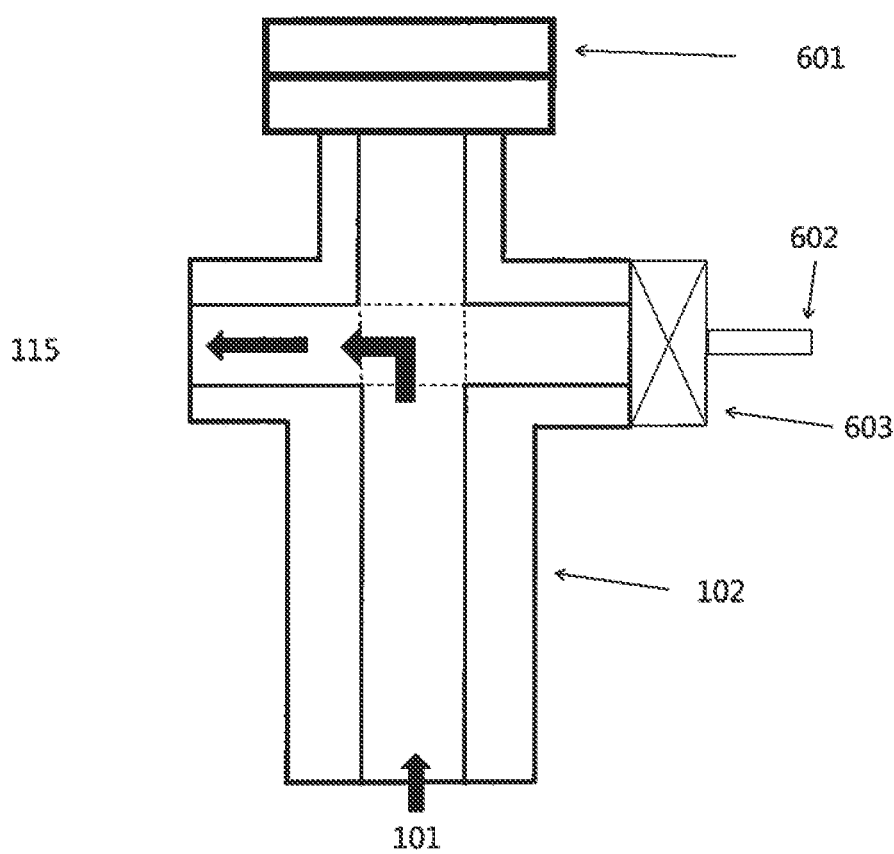
FIG. 6 schematically illustrates a cross-sectioned side view of a wellhead without an installed modular solids separator system.

The solids free production flow leaves the top of the solids separation module via the fluid outlet 111 and enters the flow collection component 112, see FIG. 1. The solids separation system can consist of several modules, and FIGS. 2 and 3 show a schematic top view of a four and three module system, respectively. In each system, the flow collection component 112 is adapted to co-mingle the flow from all modules. FIG. 4 shows sketches of a side view and cross-sectional top view for a four-module system. Flow from each module enters the collection component through the orifices 401 and into conduits 402. All four conduits 402 enter a single exit conduit 403 that co-mingles the flow from all four units into exit conduit 113. As shown in FIG. 1, conduit 113 directs the processed production fluid, 114, which has solids removed, back into the wellhead 102 where it is directed around the flow adaptor 103 and exit the wellhead into the production line 115. FIG. 6 shows a schematic of the wellhead without the solids separation system, which may have been deployed when the well was first put on production and prior to significant sand production. In FIG. 6, the top of the wellhead has a blanking flange 601 and another exit has an isolation valve 603 that is connected to the kill line 602. Those skilled in the art will appreciated that heavy fluid can be pumped into the well through the kill line 602 until the hydrostatic head of heavy fluid in the well is greater than the reservoir production pressure, so that the well stops flowing or is killed. The solids separator system described herein uses the kill line exit to redirect the clean production back into the normal production line 115. Additionally, it will be appreciated a kill line can be easily added if required to the configuration shown in FIG. 1 or FIG. 5 by use of several valves and a 'T' pipe with flow 114 on one line and the kill line on the other.

Using the apparatus and method of the preferred embodiment described herein, production from a well that contains solids is cleared of solids using a modular, riser mounted separation system 100 as shown in FIG. 1, which can be configured to handle changing produced sand volumes. Such a system reduces the platform space and payload required and improves the overall production efficiency, thus reducing the capital and operational costs to the oil & gas operator. It is also easily adapted for installation on remote or satellite wellheads, where it is very difficult to install the current solids separation technology without first adding or upgrading the satellite platform. Both options are very costly, and leaving the sand in the production from such a wellhead can result in subsea flowlines becoming blocked, which requires very costly remedial work to resolve. The apparatus described in the invention provides a low cost, modular and flexible solution to these issues.

The present invention may be embodied in many different forms and should not be construed as being limited to the embodiments set forth herein; rather, these embodiments are provided so that this disclosure will be thorough and complete, and will fully convey the concept of the invention to those skilled in the art.

The invention claimed is:

1. An apparatus for separating solid particles from a hydrocarbon-containing fluid produced from an oil and/or gas production facility, the apparatus being adapted to be supported on a wellhead or a riser connected to a wellhead, the apparatus comprising:

a conduit for conveying a hydrocarbon-containing fluid from a wellhead, the conduit being adapted to be connected to the wellhead or a riser connected to the wellhead;

a solids separator in fluid communication with the conduit, the solids separator being adapted to separate solid particles from the hydrocarbon-containing fluid, the solids separator having an inlet, coupled to the conduit, for the hydrocarbon-containing fluid, a solids outlet for outputting solid particles separated by the solids separator from the hydrocarbon-containing fluid, and a fluid outlet for outputting hydrocarbon-containing fluid separated by the solids separator from the solid particles; and an output conduit, coupled to the fluid outlet, for conveying the hydrocarbon-containing fluid from the fluid outlet into a production line attached to the wellhead, the apparatus further comprising a flow adaptor which is adapted to be installed in the wellhead, wherein the flow adaptor provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles, wherein the first and second flow conduits are configured to prevent mixing of the first and second flows, wherein the flow adaptor comprises a tubular element having a pair of annular seals, each annular seal being located at a respective opposite end of the tubular element, the annular seals being adapted sealingly to engage an inner surface of the wellhead and the tubular element having a central part with a smaller cross-sectional area than the wellhead.

2. An apparatus according to claim 1 wherein the solids separator is a hydrocyclone.

3. An apparatus according to claim 1 further comprising a solid particles collection unit located beneath the solids separator such that the separated solid particles from the solids separator pass under the action of gravity into, and are collected in, said solid particles collection unit.

4. An apparatus according to claim 3 further comprising a weighing device for weighing the separated solid particles in said solid particles collection unit.

5. An apparatus according to claim 4 further comprising a fluidisation flushing system located in the vicinity of the solid particles collection unit for flushing solid particles from the solid particles collection unit.

6. An apparatus according to claim 5 further comprising a controller for the fluidisation flushing system, the controller being arranged to operate the fluidisation flushing system based on a solids weight in the solid particles collection unit detected by the weighing device.

7. An apparatus according to claim 3 further comprising at least one isolation valve between the solids separator and the solid particles collection unit, said at least one isolation valve being operable to close and isolate the solid particles collection unit from the solids separator.

8. An apparatus according to claim 1 wherein the conduit incorporates, at an input end thereof, a flange for connection to a corresponding flange of the wellhead or riser.

9. An apparatus according to claim 1 wherein the conduit incorporates, at a closed end thereof, a blanking flange for closing the closed end, the inlet for the hydrocarbon-containing fluid being located upstream, with respect to fluid flow along the conduit, of the closed end.

10. An apparatus according to claim 1 comprising a plurality of the solids separators in fluid communication with the conduit, the solids separators being arranged in a parallel configuration, each solid separator having a respective inlet coupled to the conduit and a respective fluid outlet, the plurality of fluid outlets being connected to a manifold to which the output conduit is connected.

11. An apparatus according to claim 1 wherein the output conduit is adapted to be connected to a kill line of the wellhead.

12. An oil and/or gas production facility incorporating the apparatus of claim 1 supported on a wellhead or a riser connected to a wellhead.

13. A method of separating solid particles from a hydrocarbon-containing fluid produced from an oil and/or gas production facility, the method comprising the steps of:
(i) passing a hydrocarbon-containing fluid containing solid particles from a wellhead into a conduit supported on and connected to the wellhead or a riser connected to the wellhead;
(ii) passing the hydrocarbon-containing fluid containing solid particles from the conduit into a solids separator, mounted on the conduit, through an inlet of the solids separator;
(iii) separating solid particles from the hydrocarbon-containing fluid in the solids separator;
(iv) outputting separated solid particles through a solids outlet of the solids separator; and
(v) outputting, through an output conduit into a production line attached to the wellhead, the output conduit being coupled to a fluid outlet of the solids separator, the hydrocarbon-containing fluid which has been separated from the solid particles by the solids separator,
wherein a flow adaptor is installed in the wellhead, wherein the flow adaptor provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles, wherein the first and second flow conduits are configured to prevent mixing of the first and second flows, wherein the How adaptor comprises a tubular element having a pair of annular seats, each annular seal being located at a respective opposite end of the tubular element, the annular seals sealingly engaging an inner surface of the wellhead and the tubular element having a central part with a smaller cross-sectional area than the wellhead; and in step (i) the hydrocarbon-containing fluid containing solid particles passes through the first flow conduit and in step (v) the hydrocarbon-containing fluid which has been separated from the solid particles by the solids separator passes through the second flow conduit.

14. An apparatus for separating solid particles from a hydrocarbon-containing fluid produced from an oil and/or gas production facility, the apparatus being supported on a wellhead or a riser connected to a wellhead, the apparatus comprising:
A. a conduit for conveying a hydrocarbon-containing fluid from a wellhead, the conduit being connected to the wellhead or a riser connected to the wellhead;
B. a modular system for separating solid particles from the hydrocarbon-containing fluid, the modular system comprising at least two modules, each module of the modular system comprising:
a solids separator in fluid communication with the conduit, the solids separator being adapted to separate solid particles from the hydrocarbon-containing fluid, the solids separator having an inlet, coupled to the conduit, for the hydrocarbon-containing fluid,
a solids outlet for outputting solid particles separated by the solids separator from the hydrocarbon-containing fluid, and a fluid outlet for outputting hydrocarbon-containing fluid separated by the solids separator from the solid particles;
wherein the modules are arranged in a parallel configuration, each solid separator having a respective inlet coupled to the conduit and a respective fluid outlet; and
C. an output conduit, coupled to the fluid outlets, for conveying the hydrocarbon-containing fluid from the fluid outlets of the modular system into a production line attached to the wellhead;
wherein the output conduit further comprises a flow collection component attached to the fluid outlet of each module to coiled and comingle hydrocarbon-containing fluid wherein the flow collection component comprises a manifold and the plurality of fluid outlets are connected to the manifold to which the output conduit is connected.

15. An apparatus according to claim 14 wherein the solids separators are hydrocyclones.

16. An apparatus according to claim 14 wherein each module further comprises a solid particles collection unit located beneath the solids separator such that the separated solid particles from the solids separator pass under the action of gravity into, and are collected in, said solid particles collection unit.

17. An apparatus according to claim 16 wherein each module further comprises a weighing device for weighing the separated solid particles in said solid particles collection unit.

18. An apparatus according to claim 17 wherein each module further comprises a fluidisation flushing system located in the vicinity of the solid particles collection unit for flushing solid particles from the solid particles collection unit.

19. An apparatus according to claim 18 wherein each module further comprises a controller for the fluidisation flushing system, the controller being arranged to operate the fluidisation flushing system based on a solids weight in the solid particles collection unit detected by the weighing device.

20. An apparatus according to claim 16 wherein each module further comprises at least one isolation valve between the solids separator and the solid particles collection unit, said at least one isolation valve being operable to close and isolate the solid particles collection unit from the solids separator.

21. An apparatus according to claim 14 wherein the conduit incorporates, at an input end thereof, a flange for connection to a corresponding flange of the wellhead or riser.

22. An apparatus according to claim 14 further comprising a flow adaptor which is adapted to be installed in the wellhead, wherein the flow adaptor provides a first flow conduit for passage therethrough of a first flow comprising the hydrocarbon-containing fluid containing solid particles passing through the wellhead to the conduit and a second flow conduit, connected between the output conduit and the production line, for passage therethrough of a second flow comprising the hydrocarbon-containing fluid which has been separated from the solid particles, wherein the first and second flow conduits are configured to prevent mixing of the first and second flows.

23. An apparatus according to claim 22 wherein the flow adaptor comprises a tubular element having a pair of annular seals, each annular seal being located at a respective opposite end of the tubular element, the annular seals being adapted sealingly to engage an inner surface of the wellhead and the tubular element having a central part with a smaller cross-sectional area than the wellhead.

24. An apparatus according to claim 14 wherein the output conduit is adapted to be connected to a kill line of the wellhead.

25. An apparatus according to claim 14 further comprising a controller for controlling the modular system whereby for at least a portion of time during a period of separating solid particles from the hydrocarbon-containing fluid produced from the oil and/or gas production facility, at least one of the plurality of the solids separators is in a separation mode while at least one other of the plurality of the solids separators is in a solids flushing mode.

26. An apparatus according to claim 25 wherein the controller is adapted independently to control each module so as selectively to be in a separation mode or a solids flushing mode.

27. An oil and/or gas production facility incorporating the apparatus of claim 14.

\* \* \* \* \*